(12) United States Patent
Kippel et al.

(10) Patent No.: US 10,947,900 B2
(45) Date of Patent: Mar. 16, 2021

(54) INLET AIR HEATING SYSTEMS FOR COMBINED CYCLE POWER PLANTS

(71) Applicant: General Electric Company, Schenectady, NY (US)

(72) Inventors: Bradly Aaron Kippel, Greenville, SC (US); Douglas Frank Beadie, Greer, SC (US); Dean Matthew Erickson, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 62 days.

(21) Appl. No.: 16/171,722

(22) Filed: Oct. 26, 2018

(65) Prior Publication Data

US 2020/0131990 A1   Apr. 30, 2020

(51) Int. Cl.
| | | |
|---|---|---|
| F02C 7/04 | (2006.01) |
| F02C 7/05 | (2006.01) |
| F01K 23/10 | (2006.01) |
| F01D 17/02 | (2006.01) |
| F02C 7/047 | (2006.01) |
| F02C 7/057 | (2006.01) |
| F02C 7/08 | (2006.01) |
| F01K 17/02 | (2006.01) |
| F02C 1/04 | (2006.01) |
| F02C 1/05 | (2006.01) |
| F02C 7/143 | (2006.01) |

(52) U.S. Cl.
CPC ............ *F02C 7/047* (2013.01); *F01K 17/025* (2013.01); *F01K 23/10* (2013.01); *F02C 1/04* (2013.01); *F02C 1/05* (2013.01); *F02C 7/057* (2013.01); *F02C 7/08* (2013.01); *F02C 7/143* (2013.01); *F05D 2260/20* (2013.01)

(58) Field of Classification Search
CPC .... F02C 7/04; F02C 7/047; F02C 7/05; F02C 7/057; F02C 7/08; F02C 1/04; F02C 1/05; F01K 7/025; F01K 23/04; F01K 23/10; F05D 2220/72; F05D 2220/722
See application file for complete search history.

(56) References Cited

U.S. PATENT DOCUMENTS 6,105,362 A * 8/2000 Ohtomo .................. F01K 23/10
                                                                 60/39.182
8,356,466 B2    1/2013  Motakef et al.
(Continued)

*Primary Examiner* — Andrew H Nguyen
(74) *Attorney, Agent, or Firm* — James Pemrick; Hoffman Warnick LLC

(57) ABSTRACT

Inlet air heating systems for combined cycle power plants and combined cycle power plants including inlet air heating systems are disclosed. The inlet air heating systems may include a plurality of heating coil assemblies partially positioned within an inlet housing of a gas turbine system, and a vent valve in fluid communication with each of the heating coils. The inlet air heating system may also include a supply line in fluid communication with the heating coils to provide water to the heating coils, and a hot water line in fluid communication with the supply line and a component positioned downstream of a condenser of the combined cycle power plant. The hot water line may provide hot water from the combined cycle power plant to the supply line. Additionally, the inlet air heating system may include a drain line in fluid communication with the heating coils and the condenser.

17 Claims, 3 Drawing Sheets

(56) References Cited

U.S. PATENT DOCUMENTS

| | | |
|---|---|---|
| 8,468,830 B2 | 6/2013 | Motakef et al. |
| 9,016,065 B2 | 4/2015 | Bezat et al. |
| 2008/0298957 A1 | 12/2008 | Chillar et al. |
| 2010/0199670 A1* | 8/2010 | Robertson .......... B01D 19/0063 60/657 |
| 2011/0146225 A1* | 6/2011 | Harada .................. F01K 23/10 60/39.182 |
| 2011/0197592 A1* | 8/2011 | Bezat ..................... F02C 7/143 60/772 |

* cited by examiner

INLET AIR HEATING SYSTEMS FOR COMBINED CYCLE POWER PLANTS

BACKGROUND OF THE INVENTION

The disclosure relates generally to combined cycle power plants, and more particularly, to inlet air heating systems for the combined cycle power plants.

Power systems typically include a variety of different turbomachines and/or systems that are used to generate operational load and/or power output. Two conventional power systems used to generate operational loads include gas turbine systems and combined cycle power plants, which typically include a gas turbine system(s). Conventional combined cycle power plants employ one or multiple gas turbine system(s) operatively coupled to one or multiple steam turbine system(s). The gas turbine system(s) and steam turbine system(s) are usually coupled to and/or includes an external component, such as a generator, for producing a load or power output. In a typical combined cycle power plant, exhaust gas from the gas turbine is passed to a heat recovery steam generator (HRSG), which may be used to reheat and provide steam to the steam turbine system for enhanced efficiency of the system and/or power plant. Downstream of the HRSG the exhaust gas is released to the atmosphere through a stack.

Gas turbine systems, whether included in a combined cycle power plant or as a stand-alone system, typically utilize ambient air within the system for generating operational loads. The ambient air is taken into the system via an air inlet housing positioned upstream of a compressor of the gas turbine system. When gas turbine systems are operating in cold-weather environments, the ambient air utilized by the gas turbine systems may be at a temperature that increases the operational efficiency and/or power output by the gas turbine system under base-load demand or operations. However, the gas turbine systems often operate under part load demands. To meet part load demands, inlet guide vanes of the gas turbine systems may be (partially) closed to reduce the amount of intake air taken into the gas turbine system. However, by reducing the amount of intake air, the operational efficiency of the compressor for the gas turbine system is reduced. In turn, the gas turbine system requires additional fuel in order to meet the desired, part load demands and/or provide the desired output.

Other conventional gas turbine systems may include air to fluid heat exchanger systems to meet part load demands. These conventional heat exchanger systems may be in fluid communication with air inlet housing of the gas turbine system, and are typically stand-alone systems and/or a collection of components that are independent from the gas turbine system and/or the components of the combined cycle power plant. The conventional heat exchanger systems include heat exchanger components (e.g., coils, pipes, or fins) positioned directly within the inlet housing. The ambient air may contact and/or flow over the heat exchanger components, and may undergo a heat exchanging process (e.g., warmed) prior to the ambient air entering the compressor of the gas turbine system. By warming the intake air prior to it entering the compressor of the gas turbine system, the inlet guide vanes may remain completely open. As such, the operational efficiency of the compressor may not be reduced, and the gas turbine system may meet the partial load demand with a reduced fuel requirement.

Warming the intake air and/or including the heat exchanger system within the inlet housing may also reduce or eliminate the icing risk of internal components (e.g., filters) included within the inlet housing. That is, independent of meeting part load demands and/or improving part load efficiencies for the gas turbine system, the heat exchanger system may also be utilized as an anti-icing agent for filters and/or inlet housing of the gas turbine system operating in cold-weather environments.

While these conventional heat exchanger systems do provide an alternative to (partially) closing the inlet guide vanes and increasing the fuel consumption by the gas turbine system in cold-weather environments, they create additional problems or issues for the gas turbine systems and/or combined cycle power plants. For example, because the conventional heat exchanger systems are stand-alone systems from the gas turbine systems and/or combined cycle power plant, they require additional components and/or resources (e.g., additional heaters, pumps). As such, the use of the conventional heat exchanger systems increases the cost of both building/implementing the heat exchanger system within the gas turbine systems, as well as increase a maintenance cost associated within maintaining and/or fixing the stand-alone, conventional heat exchanger systems. Additionally during an inoperable state of gas turbine system (e.g., shutdown, maintenance) the pipes or conduits of the conventional heat exchanger systems are not typically drained due to the difficulties and/or cost of refilling the system with new fluid. For example, the pipes or conduits of the heat exchanger system can be 20 to 30 feet wide. The large width of the pipes or conduits makes it impractical to drain, partially or completely, all of the pipes or conduits of the heat exchanger system. Because of this, a pure-water fluid cannot be used by the conventional heat exchanger system, as the pipes or conduits of the system may freeze and/or become damaged (e.g., burst, crack) during the inoperable state of gas turbine system due to the cold-weather environment (e.g., ambient temperature is below 0° C.). As a result, conventional heat exchanger systems use a water-glycol mixture, to prevent the fluid within the system from freezing during the inoperable state of gas turbine system. However, the water-glycol mixture has less effective heat transfer characteristics than pure water, making the water-glycol mixture less effective when heating the ambient air in the cold-weather environment which may increase system or operation costs, weight/size, and/or airside pressure drop.

BRIEF DESCRIPTION OF THE INVENTION

A first aspect of the disclosure provides an inlet air heating system for a gas turbine system of a combined cycle power plant. The inlet air heating system includes: a plurality of heating coil assemblies at least partially positioned within an inlet housing of the gas turbine system; a vent valve in fluid communication with each of the plurality of heating coil assemblies, the vent valve allowing air to flow into and out of the plurality of heating coil assemblies when in an open position; a supply line in fluid communication with the plurality of heating coil assemblies, the supply line providing water to the plurality of heating coil assemblies; a hot water line in fluid communication with the supply line and a component of the combined cycle power plant positioned downstream of a condenser of the combined cycle power plant, the hot water line providing hot water from the combined cycle power plant to the supply line; and a drain line in fluid communication with the plurality of heating coil assemblies and the condenser of the combined cycle power plant, the drain line providing the water from the plurality of heating coil assemblies to the condenser.

A second aspect of the disclosure provides a combined cycle power plant including: a gas turbine system including an inlet housing for receiving ambient air; a heat recovery steam generator (HRSG) in fluid communication with the gas turbine system, the HRSG receiving exhaust gas from the gas turbine system; a steam turbine in fluid communication with the HRSG, the steam turbine receiving steam generated by the HRSG using the exhaust gas from the gas turbine system; a condenser in fluid communication with the steam turbine, the condenser receiving exhaust steam from the steam turbine; and an inlet air heating system in communication with the inlet housing of the gas turbine system and in communication with the condenser, the inlet air heating system including: a plurality of heating coil assemblies at least partially positioned within the inlet housing of the gas turbine system; a vent valve in fluid communication with each of the plurality of heating coil assemblies, the vent valve allowing air to flow into and out of the plurality of heating coil assemblies when in an open position; a supply line in fluid communication with the plurality of heating coil assemblies, the supply line providing water to the plurality of heating coil assemblies; a hot water line in fluid communication with the supply line and one of the HRSG or a conduit positioned downstream of a condenser, the hot water line providing hot water to the supply line; and a drain line in fluid communication with the plurality of heating coil assemblies and the condenser, the drain line providing the water from the plurality of heating coil assemblies to the condenser.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
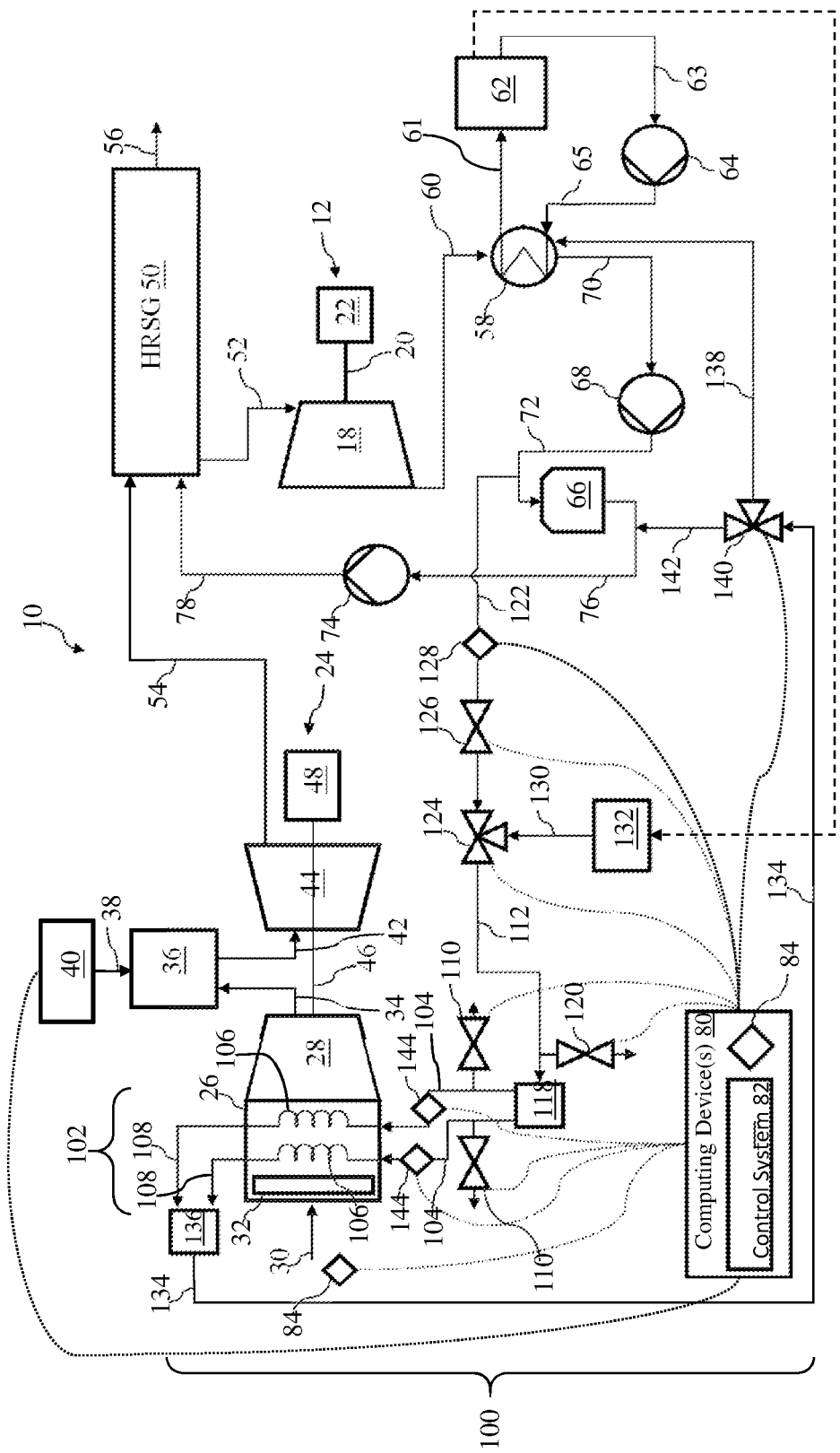
FIG. 1 shows a schematic view of a combined cycle power plant including a gas turbine system, a steam turbine, and an inlet air heating system, according to embodiments of the disclosure.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As an initial matter, in order to clearly describe the current disclosure it will become necessary to select certain terminology when referring to and describing relevant machine components within the combined cycle power plant. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

As indicated above, the disclosure relates generally to combined cycle power plant, and more particularly, to inlet air heating systems for the combined cycle power plants.

These and other embodiments are discussed below with reference to FIGS. 1-3. However, those skilled in the art will readily appreciate that the detailed description given herein with respect to these Figures is for explanatory purposes only and should not be construed as limiting.

FIG. 1 shows a schematic depiction of a combined cycle power plant 10 (hereafter, "power plant 10") including a steam turbine (ST) system 12. In the non-limiting example shown in FIG. 1, ST system 12 can include a single steam turbine 18. In another non-limiting example, ST system 12 may include a high pressure (HP) portion, an intermediate pressure (IP) portion and a low pressure (LP) portion. Steam turbine 18 of ST system 12 may be coupled, positioned on, and/or may be configured to rotate a shaft 20 to produce mechanical work and/or to drive additional component(s) of ST system 12. As shown in FIG. 1, shaft 20 of ST system 12 may be coupled to and/or may drive an external component, and more specifically, a generator 22 configured to generate power and/or produce a load.

Power plant 10 can further include a gas turbine (GT) system 24. GT system 24 may include an inlet housing 26 coupled to a compressor 28. Inlet housing 26 may receive an incoming flow of fluid 30 (e.g., ambient air) that may be utilized by GT system 24 to generate power, as discussed herein. A filter(s) 32 positioned within inlet housing 26 of GT system may filter out debris and/or undesired particulates within fluid 30, before providing fluid 30 to compressor 28 of GT system 24. As shown in FIG. 1, and as discussed herein, inlet housing 26 of GT system 24 may also include at least a portion of an inlet air heating system 100 positioned therein that may heat incoming fluid 30 prior to providing fluid 30 to compressor 28.

Compressor 28 compresses incoming flow of fluid 30 as it flows from inlet housing 26 through compressor 28. Compressor 28 of GT system 24 may also include stator vanes (not shown) and blade assemblies (not shown) positioned within compressor 28. The stator vanes and rotor blade assemblies positioned within compressor 28 may be configured to be aid in moving and/or passing fluid 30 through compressor 28.

Compressor 28 delivers a flow of compressed fluid 34 (e.g., compressed air) to a combustor 36. Combustor 36 mixes the flow of compressed fluid 34 with a pressurized flow of fuel 38 provided by a fuel supply 40 and ignites the mixture to create a flow of combustion gas 42. The flow of combustion gas 42 is in turn delivered to a turbine component 44, which typically includes a plurality of turbine blade assemblies (not shown) and stator vanes (not shown), similar to compressor 28. The flow of combustion gas 42 drives turbine component 44 to produce mechanical work. The mechanical work produced in turbine component 44 drives compressor 28 via a shaft 46, and may be used to drive a generator 48 (e.g., external component) configured to generate power and/or produce a load.

Although power plant 10 is shown in FIG. 1 to include a dual-shaft configuration, where two separate generators 22, 48 are utilized, it is understood that in other non-limiting examples, ST system 12 and GT system 24 may share a single shaft and in turn, may share a single generator. Additionally, although power plant 10 is shown to only include a single ST system 12 and single GT system 24, it is understood that power plant 10 may include a plurality of ST systems 18 and/or GT system(s) 24 that may be configured to generate an operational load and/or power output (e.g., part load demand).

Power plant 10 can further include a heat recovery steam generator (HRSG) 50 fluidly connected with the ST system 12 (e.g., steam turbine 18) and GT system 24. As shown in the non-limiting example of FIG. 1, HRSG 50 may be fluidly connected and/or coupled with ST system 12 and may provide steam generated within HRSG 50 to the steam turbine 18 of ST system 12 via supply conduits 52. Additionally in the non-limiting example, HRSG 50 may be fluidly connected and/or coupled with GT system 24 via an exhaust channel 54 coupled to and/or in fluid communication with turbine component 44. Exhaust channel 54 may provide exhaust fluid (e.g., gas) from GT system 24 to HRSG 50 to be utilized in generating and/or heating steam for ST system 12. A stack 56 of HRSG 50 may exhaust or release (excess or used) gas and/or fluid from HRSG 50 into the atmosphere and/or out of power plant 10.

Power plant 10 can further include a condenser 58. Condenser 58 may be in fluid communication and/or may be fluidly coupled with various components of power plant 10. In a non-limiting example, condenser 58 may be fluidly connected and/or coupled to steam turbine 18 of ST system 12 via steam exhaust duct 60. Condenser 58 may be configured to condense exhaust flow and/or bypass flow (not shown) from ST system 12 and/or HRSG 50. That is, exhaust steam may flow from steam turbine 18 to condenser 58 via steam exhaust duct 60, where the cool water in condenser 58 may aid in condensing the exhaust steam and/or converting the exhaust steam to condensed fluid (e.g., hot water). As discussed herein, the condensed fluid may be provided to additional portions of power plant 10 (e.g., HRSG 50) for reuse.

In the non-limiting example shown in FIG. 1, condenser 58 may be fluidly coupled to and/or in communication with a cooling source 62 of power plant 10 via conduit 61. Conduit 61 may provide the water circulated through condenser 58 to form the condensed fluid to cooling source 62 to cool the water that previously underwent a heat exchange within condenser 58 when exposed to the exhaust steam from exhaust duct 60. Once cooled, the water may be recirculated back to condenser 58 of power plant 10 via a cool water pump 64. That is, cool water pump 64 may be in fluid communication with cooling source 62 and condenser 58 via first conduit 63 and second conduit, 65, respectively, to move or circulate the cooled water from cooling source 62 back to condenser 58. In the non-limiting example, conduit 63 may be fluidly coupled to cooling source 62 and cool water pump 64 to provide the water from cooling source 62 to cool water pump 64. Additionally conduit 65 may be fluidly coupled to cool water pump 64 and condenser 58 to provide the water from cool water pump 64 to condenser 58.

Condensed fluid (e.g., hot water) formed in condenser 58 may flow to a deaerator 66 via a condensate pump 68. That is, condensate pump 68 may be fluidly coupled and/or in fluid communication with condenser 58 via a conduit 70, and may receive, pull, and/or or pump the condensed fluid from condenser 58. Condensate pump 68 may also be in fluid communication and/or fluidly coupled to deaerator 66 of power plant 10 via conduit 72. Condensate pump 68 may pump the condensed fluid generated in condenser 58 to deaerator 66. Deaerator 66 in fluid communication and/or fluidly coupled to condensate pump 68 via conduit 72 may receive the condensed fluid and may remove gas(es) (e.g., air) from the condensed fluid.

Once deaerated, the condensed fluid may be provided or flow back to HRSG 50 of power plant system 10. More specifically, the deaerated, condensed fluid may flow from the deaerator 66 to a forwarding pump 74 via a conduit 76. Forwarding pump 74 may be fluidly coupled and/or in fluid communication with deaerator 66 via conduit 76, and may also be fluidly coupled and/or in fluid communication with HRSG 50 via conduit 78. Forwarding pump 74 may remove, pull, and/or pump the deaerated, condensed fluid from deaerator 66, and may subsequently provide and/or pump the deaerated, condensed fluid to HRSG 50. The deaerated, condensed fluid may be utilized by HRSG 50 to form or generate steam for steam turbine 18 of ST system 12.

As shown in FIG. 1, power plant 10 can include at least one computing device 80 configured to control power plant 10. Computing device(s) 80 can be hard-wired and/or wirelessly connected to and/or in communication with power plant 10, and its various components (e.g., ST system 12, GT system 24, HRSG 50 and so on) via any suitable electronic and/or mechanic communication component or technique. Computing device(s) 80, and its various components discussed herein, may be a single stand-alone system that functions separate from another power plant control system (e.g., computing device)(not shown) that may control and/or adjust operations and/or functions of power plant 10, and its various components (e.g., ST system 12, GT system 24 and so on). Alternatively, computing device(s) 80 and its components may be integrally formed within, in communication with and/or formed as a part of a larger power plant control system (e.g., computing device) (not shown) that may control and/or adjust operations and/or functions of power plant 10, and its various components (e.g., ST system 12, GT system 24 and so on). Although shown in FIG. 1 as only being connected to and/or in communication with fuel supply 40 of GT system 24, it is understood that computing device(s) 80 may be connected to or in communication with each of the components and/or systems of power plant 10.

In various embodiments, computing device(s) 80 can include a control system 82 for controlling operations of power plant 10. As discussed herein, control system 82 can control power plant 10, and its' various components (e.g., ST system 12, GT system 24, HRSG 50, condenser 58, and so on). Additionally, and as discussed herein, control system 82 of computing device(s) 80 may also control operations and/or functions of inlet air heating system 100, and its various components to optimize operations of power plant 10, and/or to prevent damage to portions of inlet air heating system 100 during non-operational states of power plant 10.

As shown in FIG. 1, computing device(s) 80 may include and/or may be in electrical and/or mechanical communication with at least one sensor 84 positioned within, adjacent to, and/or around power plant 10 to detect operational characteristic(s) of components (e.g., steam turbine 18, compressor 28, and so on) of power plant 10, and/or characteristics of the environment (e.g., ambient temperatures) surrounding power plant 10, as discussed herein. As shown in the non-limiting example of FIG. 1, sensor 84 of and/or connected to computing device(s) 80 may be positioned adjacent inlet housing 26 of GT system 24. Sensor 84 in communication with computing device(s) 80 of power plant 10 may be any suitable sensor or device configured to detect and/or determine ambient conditions and/or environmental characteristics for power plant 10. The ambient conditions or environmental characteristics for power plant 10 that may be detected and/or determined by sensor 84 may include data, information and/or characteristics relating to weather, climate, and/or conditions of the geography, area and/or space surrounding power plant 10. For example, sensor 84 may detect and/or determine the temperature of the ambient air surrounding inlet housing 26 and/or the temperature of the ambient air forming fluid 30 flowing into inlet housing 26 and utilized by GT system 24.

Sensor 84 may be configured to provide computing device(s) 80, and specifically control system 82, with information or data relating to the ambient conditions and/or environmental characteristics for power plant 10, to aid in heating fluid 30 to a desired temperature using inlet air heating system 100. That is, and as discussed herein, computing device(s) 80 and/or control system 82 may utilize the temperature of the ambient air forming fluid 30, as detected by sensor 84, and may adjust the function or operation of inlet air heating system 100, to ensure fluid 30 is heated to a desired temperature before entering compressor 28 and/or being utilized by GT system 24.

Additionally as shown in FIG. 1, power plant 10 includes inlet air heating system 100. Inlet air heating system 100 may aid in heating fluid 30 (e.g., ambient air) flowing through inlet housing 26 to a desired temperature before fluid 30 enters compressor 28 and/or is utilized by GT system 24. As discussed herein, inlet air heating system 100 may be in direct fluid communication with power plant 10 and/or may utilize fluid (e.g., water) of power plant 10 during operation of the system. Additionally, and as discussed herein, inlet air heating system 100 may allow for portions of the system positioned within inlet housing 26 to be drained during non-operational states of power plant 10. As such, the risk of damage (e.g., burst pipes) or undesirable operating conditions (e.g., frozen pipes) may be substantially minimized or eliminated for inlet air heating system 100 of power plant 10.

As shown in FIG. 1, inlet air heating system 100 may including a plurality of coil assemblies 102. At least a portion of each coil assembly 102 may be positioned within inlet housing 26 of GT system 24 to heat up fluid 30 flowing through inlet housing 26 to a desired temperature before entering compressor 28, as discussed herein. In the non-limiting example shown in FIG. 1, each of the plurality of coil assemblies 102 may include an inlet portion 104, a coil portion 106, and an outlet portion 108.

Inlet portion 104 of coil assembly 102 may be in fluid communication with and may be positioned upstream of coil portion 106. Additionally, and as discussed herein, inlet portion 104 may be in fluid communication with and/or fluidly coupled to a distinct portion of inlet air heating system 100 to receive and provide water to coil portion 106 for heating fluid 30 within inlet housing 26. Coil portion 106 of coil assembly 102 may be positioned downstream of inlet portion 104 and upstream of outlet portion 108, such that coil portion 106 is positioned between, fluidly couples, and/or is in fluid communication with inlet portion 104 and outlet portion 108. As shown in the non-limiting example, coil portion 106 may be positioned within inlet housing 26 of GT system 24. More specifically, coil portion 106 may be positioned within inlet housing 26, and may extend over and/or be positioned within the flow path or space of fluid 30 flowing through inlet housing 26. In FIG. 1, coil portion 106 may include a portion or section of pipe of coil assembly 102 that includes a plurality of turns that may contact and/or allow fluid 30 to flow over to warm fluid 30 to a desired temp before entering compressor 28, as discussed herein.

In the non-limiting example shown in FIG. 1, coil portion 106 of coil assemblies 102 for inlet air heating system 100 may be positioned within inlet housing 26 and downstream of filter 32. In other non-limiting examples (see, FIG. 3) coil portion 106 of coil assemblies 102 may be positioned within inlet housing 26, upstream of filter 32. Alternatively, and in the non-limiting example where inlet air heating system 100 includes a plurality of coil assemblies 102, coil portions 106 may be positioned within inlet housing 26 both upstream and downstream of filter 32.

Outlet portion 108 of coil assembly 102 may be positioned downstream of and in fluid communication with coil portion 106. Outlet portion 108 may receive water from coil portion 106 after the water has been used in the heat exchange process with fluid 30, as discussed herein. Outlet portion 108 may also provide the water from coil portion 106 to other downstream portions or components of inlet air heating system 100 to be recirculated and/or reused with within power plant 10, as discussed herein.

Although two coil assemblies 102 are shown in the non-limiting example of FIG. 1, it is understood that inlet air heating system 100 for power plant 10 may include more or less coil assemblies 102. As such, the number of coil assemblies 102 depicted in FIG. 1 is merely illustrative. Additionally, although each coil assembly 102 shown in FIG. 1 includes only a single coil portion 106, it is understood that coil assembly 102 may include a plurality of coil portions 106, each positioned within inlet housing 24, and in fluid communication with inlet portion 104 and outlet portion 108, respectively. Furthermore, the number of turns included in coil portion 106 for each coil assembly 102 is merely illustrative. As such, coil portion 106 for each coil assembly 102 may include more or less turns than those shown in the non-limiting example of FIG. 1.

In the non-limiting example shown in FIG. 1, inlet air heating system 100 may also include vent valves 110. Vent valves 110 may be in fluid communication each of the plurality of heating coil assemblies 102. More specifically, a single vent valve 110 may in fluid communication and/or fluidly coupled to inlet portion 104 for each of the plurality of heating coil assemblies 102 of inlet air heating system 100. As shown in FIG. 1, vent valves 110 may be positioned outside of inlet housing 26. Vent valves 110 may be formed from any fluid or pressure release valve that may allow air to flow into or out of heating coil assemblies 102, and more specifically inlet portion 104, when vent valve 110 is in an open position. As discussed herein, vent valves 110 may aid in the removal of the water from heating coil assemblies 102 when GT system 24 is in a non-operational state (e.g., shutdown), and may aid in the removal of air within heating coil assemblies 102 when GT system 24 is in a start-up or operational state. Computing device(s) 80 may be in communication to with each vent valve 110 of inlet air heating system 100 to control the position of vent valve 110, and/or to adjust vent valves 110 from an open position to a closed position, as discussed herein.

Inlet air heating system 100 may also include a supply line 112 in fluid communication with the plurality of heating coil assemblies 102. More specifically, supply line 112 may be in fluid communication and/or may be fluidly coupled to each inlet portion 104 for each of the plurality of heating coil assemblies 102 of inlet air heating system 100. In the non-limiting example shown in FIG. 1, supply line 112 may be fluidly coupled each of the inlet portions 104 for heating coil assemblies 102 via a two way junction or connector 118 (hereafter, "connector 118"), to provide water to the plurality of heating coil assemblies 102 to heat fluid 30 flowing through inlet housing 26, as discussed herein.

A drain valve 120 may be positioned on and/or in fluid communication with supply line 112. That is, inlet air heating system 100 may include drain valve fluidly coupled to and/or in fluid communication with supply line 112. Drain valve 120 may be formed from any fluid or pressure release valve that may allow the water flowing through supply line 112 to be purged when drain valve 120 is in an open position. As discussed herein, drain valves 120 may aid in the removal of the water from supply line 112 when GT system 24 is in a non-operational state. Similar to vent valves 110, computing device(s) 80 may be in communication to with drain valve 120 of inlet air heating system 100 to control the operational state of drain valve 120, and/or to adjust drain valve 120 from an open position to a closed position, as discussed herein.

As shown in FIG. 1, inlet air heating system 100 may also include a hot water line 122. Hot water line 122 may be fluidly coupled to and/or in fluid communication with supply line 112. More specifically, a mixing valve 124 may fluidly couple hot water line 122 and supply line 112. Hot water line 122 may also be in fluid communication with a component of power plant 10. That is, hot water line 122 may be in direct fluid communication and/or may be fluidly coupled to a component of power plant 10, such that hot water line 122 may provide hot water from power plant 10 to supply line 112 via mixing valve 124. In the non-limiting example shown in FIG. 1, hot water line 122 may be in fluid communication with and/or may be fluidly coupled to conduit 72 of power plant 10 that fluidly couples condensate pump 68 and deaerator 66. In this non-limiting example, the hot water provided to supply line 112 via hot water line 122 may be the condensed fluid (e.g., hot water) of power plant 10 that previously passed through condenser 58 and/or condensate pump 68, but has not yet passed through deaerator 66 to undergo a deaeration process, as discussed herein.

A stop valve 126 may be positioned on hot water line 122. More specifically, stop valve 126 may be positioned on, fluidly coupled to, and/or in fluid communication with hot water line 122. Stop valve 126 may also be positioned upstream of mixing valve 124. Stop valve 126 may stop hot water from flowing to and/or prevent hot water line 122 from supplying hot water from conduit 72 to supply line 112 when GT system 24 is in a non-operational state (e.g., shutdown). As shown in FIG. 1, computing device(s) 80 may be in communication to with stop valve 126 of inlet air heating system 100 to control the operational state of stop valve 126, and/or to adjust stop valve 126 from an open position to a closed position, as discussed herein.

A fluid-temperature sensor 128 may also be positioned within hot water line 122 and/or in communication with the hot water flowing through hot water line 122. Fluid-temperature sensor 128 may detect the temperature of the hot water flowing from conduit 72 to hot water line 122 before the hot water is provided to supply line 112. As shown in FIG. 1, fluid-temperature sensor 128 of inlet air heating system 100 may be in communication with computing device(s) 80 to provide computing device(s) 80 and/or control system 82 the detected temperature of the hot water flowing through hot water line 122. As discussed herein, computing device(s) 80 and/or control system 82 may utilize the information provided by fluid-temperature sensor 128 to adjust the temperature of the water in supply line 112 before it is provided to the plurality of heating coil assemblies 102 of inlet air heating system 100. Fluid-temperature sensor 128 may be formed from any suitable temperature gauge, meter, or sensor that is configured to detect and/or determine the temperature of the hot water flowing through hot water line 122.

As discussed herein, mixing valve 124 may fluidly couple supply line 112 and hot water line 122. Additionally, and as shown in the non-limiting example of FIG. 1, mixing valve 124 of inlet air heating system 100 may also fluidly couple a cold water line 130 to supply line 112 and hot water line 122. That is, mixing valve 124 may also fluidly couple cold water line 130 to supply line 112 and/or put cold water line 130 in fluid communication with supply line 112 and hot water line 122. Cold water line 130 may provide cold water to mixing valve 124 to be mixed with the hot water provided by hot water line 122. In the non-limiting example shown in FIG. 1, cold water line 130 may be in fluid communication with and/or may provide cold water from a reservoir 132. Reservoir 132 may be filled with cold water that is supplied from an additional source (not shown), or alternatively may be filled with cold water from cooling source 62 of power plant 10. As discussed herein, cold water line 130 may provide cold water to be mixed with and reduce the temperature of the hot mater provided by hot water line 122, before the water enters supply line 112 and is subsequently provided to the plurality of heating coil assemblies 102 of inlet air heating system 100. Similar to vent valves 110 and drain valve 120, computing device(s) 80 may be in communication to with mixing valve 124 of inlet air heating system 100 to control mixing valve 124, and/or allow cold water line 130 to provide cold water to be mixed with the hot water provided by hot water line 122, as discussed herein. Mixing valve 124 may be formed as any suitable device or component (e.g., valve) that may fluidly couple supply line 112, hot water line 122, and cold water line 130. In non-limiting examples, mixing valve 124 may formed as a three way valve, a Y-type valve, or two (2) fluidly coupled two way valves.

Although shown as being positioned within hot water line 122 and/or in communication with the hot water flowing through hot water line 122, it is understood that fluid-temperature sensor 128 may be positioned in a distinct portion or component of inlet air heating system 100. For example, fluid-temperature sensor 128 may be positioned within supply line 112 and/or in communication with the water included within supply line 112. In the non-limiting example, fluid-temperature sensor 128 may detect the temperature of the hot water provided via hot water line 122 and/or the cold water provide via cold water line 130 flowing through supply line 112. Fluid-temperature sensor 128 may be in communication with computing device(s) 80 to provide computing device(s) 80 and/or control system 82 the detected temperature of the water flowing through supply line 112. Computing device(s) 80 and/or control system 82 may in turn utilize the information provided by fluid-temperature sensor 128 to adjust the temperature of the water in supply line 112 by adjusting the amount of hot water supplied by hot water line 122 and/or cold water supplied by cold water line 130 to ensure the water supplied to the plurality of heating coil assemblies 102 is at a desired temperature, as discussed herein.

Inlet air heating system 100 may also include a discharge line 134. Discharge line 134 may be in fluid communication with the plurality of heating coil assemblies 102. More specifically, discharge line 134 may be in fluid communication and/or may be fluidly coupled to each outlet portion 108 for each of the plurality of heating coil assemblies 102 of inlet air heating system 100. In the non-limiting example shown in FIG. 1, discharge line 134 may be fluidly coupled each of the outlet portions 108 for heating coil assemblies 102 via two way connector 136 similar to connector 118, to receive water from the plurality of heating coil assemblies 102, and provide, recirculate, and/or reuse the water with within power plant 10, as discussed herein.

In a non-limiting example shown in FIG. 1, inlet air heating system 100 may include a drain line 138. Drain line 138 may be in fluid communication with the plurality of heating coil assemblies 102. More specifically, drain line 138 may be in fluid communication with and/or may be fluidly coupled to outlet portion 108 of heating coil assemblies 102 via discharge line 134, and a control valve 140. Control valve 140 may fluidly couple discharge line 134 and drain line 138 to allow the water that previously passed through heating coil assemblies 102 to flow from discharge line 134 to drain line 138. As shown in FIG. 1, drain line 138 may also be in fluid communication and/or may be in direct fluid communication with condenser 58 of power plant 10. Drain line 138 in fluid communication and/or fluidly coupled to condenser 58 of power plant 10 may provide the water from the plurality of heating coil assemblies 102 and discharge line 134, to condenser 58. As discussed herein, the water from heating coil assemblies 102 and discharge line 134 that may be provided to condenser 58 via drain line 138 may be stored and/or utilized by condenser 58 during the operation of power plant 10.

As discussed herein, control valve 140 may fluidly couple discharge line 134 and drain line 138. Additionally, and as shown in the non-limiting example of FIG. 1, control valve 140 of inlet air heating system 100 may also fluidly couple a return line 142 to discharge line 134 and drain line 138. That is, control valve 140 may also fluidly couple return line 142 to discharge line 134 and/or put return line 142 in fluid communication with discharge line 134 and drain line 138. Similar to drain line 138, return line 142 may receive the water that previously passed through heating coil assemblies 102 to flow from discharge line 134 to return line 142 via control valve 140. Return line 142 may also be in fluid communication with and/or fluidly coupled to a conduit of power plant 10 positioned downstream of condenser 58. In the non-limiting example shown in FIG. 1, return line 142 may be in fluid communication with and/or fluidly coupled to conduit 76 positioned between and/or fluidly coupling deaerator 66 and forwarding pump 74 of power plant 10. In this non-limiting example, return line 142 may provide the water from the plurality of heating coil assemblies 102 and discharge line 134 back into power plant 10 via conduit 76 to be recirculated and/or reused with within power plant 10, as discussed herein. Similar to previously discussed valves 110, 120, 124, 126, computing device(s) 80 may be in communication to with control valve 140 of inlet air heating system 100 to regulate control valve 140, and/or allow discharge line 134 to provide the water previously used within heating coil assemblies 102 to drain line 138 and/or return line 142, as discussed herein. Similar to mixing valve 124, control valve 140 may be formed as any suitable device or component (e.g., valve) that may fluidly couple discharge line 134, drain line 138, and return line 142. In non-limiting examples, control valve 140 may formed as a three way valve, a Y-type valve, or two (2) fluidly coupled two way valves.

When GT system 24 is in an operational state, inlet air heating system 100 may heat fluid 30 flowing through inlet housing 26 to a desired temperature to maintain or improve operational efficiency of compressor 28 of GT system 24 included in power plant 10, and/or reduce the required fuel consumption by GT system 24. That is, where fluid 30 includes an initial or ambient temperature, as detected by sensor 84, that is below a desired temperature for use within GT system 24, inlet air heating system 100 of power plant 10 may be utilized to increase the temperature of fluid 30 before fluid 30 enters compressor 28. In the non-limiting example shown in FIG. 1, hot water (e.g., condensed water) from conduit 72 of power plant 10 may be provided to supply line 112 via hot water line 122. In this non-limiting example where GT system 24 is in the operational state, stop valve 126 positioned on and/or in fluid communication with hot water line 122 may be opened to allow the hot water to flow to mixing valve 124.

The temperature of the hot water flowing through hot water line 122 may be detected by fluid-temperature sensor 128 and may be provided to control system 82 of computing device(s) 80. Control system 82 may in turn determine if the hot water in hot water line 122 is at a desired temperature or within a desired temperature range for heating fluid 30 to the desired temperature to maintain or improve operational efficiency of compressor 28 of GT system 24 included in power plant 10. If the hot water in hot water line 122 is at a desired temperature or within a desired temperature range, then control system 82 may adjust mixing valve 124 so cold water line 130 is not providing cold water to be mixed with the hot water before it enters supply line 112. Conversely, if the hot water in hot water line 122 is not at a desired temperature or within a desired temperature range (e.g., too hot), then control system 82 may adjust mixing valve 124 so cold water line 130 is providing cold water to be mixed with the hot water before it enters supply line 112. Control system 82 may adjust mixing valve 124 to add and mix cold water with the hot water in order to ensure that the water (e.g., mixed hot water and cold water) entering supply line 112 is equal to the desired temperature or within the desired temperature range for heating fluid 30 to the desired temperature, as discussed herein.

Supply line 112 may then provide the water to heating coil assemblies 102. More specifically, supply line 112 may provide the water to coil portion 106 of heating coil assemblies 102, via connector 118 and inlet portions 104, so the water at the desired temperature or within the desired temperature range for heating fluid 30 is flowing through coil portion 106 positioned within inlet housing 26 as fluid 30 flows therein. In the non-limiting example when GT system 24 is in the operational state, drain valve 120 in fluid communication with supply line 112 may be closed and/or may not allow the water to be purged from supply line 112. Additionally in the non-limiting example where GT system 24 is in the operational state, vent valves 110 in fluid communication with inlet portion 104 of heating coil assemblies 102 may be closed and/or may not allow the water to be purged from heating coil assemblies 102.

As fluid 30 flows over and/or contacts coil portion 106 of heating coil assemblies 102, a heat exchange process may take place. That is, coil portion 106 including the water having the desired temperature or within the desired temperature range may transfer its heat to and/or may substantially heat-up fluid 30 within inlet housing 26. Fluid 30 may be heated to the desired temperature to maintain or improve operational efficiency of compressor 28 of GT system 24 included in power plant 10. The now heated fluid 30 may flow to compressor 28 of GT system 24, and the (now cooler) water may flow from coil portion 106, to outlet portion 108 of heating coil assemblies 102, and subsequently to discharge line 134 via connector 136.

In a non-limiting example when GT system 24 is in the operational state, control valve 140 may provide the water from the plurality of heating coil assemblies 102 and discharge line 134 to return line 142 only. That is, control system 82 may adjust control valve 140 so no portion of the water from the plurality of heating coil assemblies 102 and discharge line 134 is provided to drain line 138. In this not-limiting example, the water previously used by heating coil assemblies 102, and provided by discharge line 134, may flow through return line 142 to conduit 76 of power plant 10. Once provided to conduit 76, the water previously flowed through inlet air heating system 100 to heat fluid 30 may be provided to and utilized by HRSG 50, as discussed herein.

In another non-limiting example when GT system 24 is in the operational state, control valve 140 may provide the water from the plurality of heating coil assemblies 102 and discharge line 134 to drain line 138 and return line 142. That is, control system 82 may adjust control valve 140 so distinct portions of the water from the plurality of heating coil assemblies 102 and discharge line 134 are provided to drain line 138 and return line 142. In this not-limiting example, a portion of the water previously used by heating coil assemblies 102, and provided by discharge line 134, may flow through return line 142 to conduit 76 of power plant 10, as discussed herein. Additionally, a portion of the water previously used by heating coil assemblies 102, and provided by discharge line 134, may flow through drain line 138 and may be provided to and utilized by condenser 58 of power plant 10, as discussed herein. Control system 82 may adjust control valve 140 to provide the water to both drain line 138 and return line 142 in anticipation of a shutdown of GT system 24 and/or power plant 10, for example.

When GT system 24 is in a non-operational state, inlet air heating system 100 may drain the water included therein, and/or may provide the water to distinct portions of power plant 10. In the non-limiting example where GT system 24 is in the non-operational state, stop valve 126 positioned on and/or in fluid communication with hot water line 122 may be closed to prevent the hot water from flowing to mixing valve 124. That is, control system 82 may adjust stop valve 126 to prevent hot water (e.g., condensed water) provided by conduit 72 from flowing into mixing valve 124 via hot water line 122.

Additionally in the non-limiting example where GT system 24 is in the non-operational state, control system 82 may close mixing valve 124 and open drain valve 120. Mixing valve 124 may be closed when GT system 24 is in the non-operational state to prevent hot water and cold water from flowing to supply line 112 via hot water line 122 and cold water line 130, respectively. Additionally, drain valve 120 positioned on and/or in fluid communication with supply line 112 may be opened to drain or allow all of the water to be purged from supply line 112.

The remaining portions of inlet air heating system 100 may be purged and/or may have all water removed with the help of condenser 58. More specifically, and when GT system 24 is in the non-operational state, control valve 140 may provide the water from the plurality of heating coil assemblies 102 and discharge line 134 to drain line 138 only. That is, control system 82 may adjust control valve 140 so no portion of the water from the plurality of heating coil assemblies 102 and discharge line 134 is provided to return line 142. In this not-limiting example, the water previously used by heating coil assemblies 102, and provided by discharge line 134, may flow through drain line 138 directly to condenser 58 of power plant 10.

Additionally, and because of the operation and/or function of condenser 58, condenser 58 in fluid communication with drain line 138 may create and/or provide a vacuum-force within heating coil assemblies 102, discharge line 134 and drain line 138, respectively. The vacuum-force may pull or vacuum out any water that may exist within heating coil assemblies 102, discharge line 134, and drain line 138, and may ensure each of those components of inlet air heating system 100 is free from water when GT system 24 is in the non-operational state and/or when heating coil assemblies 102 is non-operational (e.g., warm-weather operating conditions). To increase the vacuum-force created by condenser 58, vent valves 110 in fluid communication with heating coil assemblies 102, and more specifically inlet portion 104, may be in an open position. More specifically, when GT system 24 is in the non-operational state, control system 82 may adjust or open vent valves 110 in fluid communication with heating coil assemblies 102 to increase the vacuum-force created by condenser 58 and/or to allow ambient air to move or flow into the plurality of heating coil assemblies 102, discharge line 134, and drain line 138. By opening vent valves 110 when GT system 24 is in the non-operation state, vent valves 110 may allow all the water previously flowing through the plurality of heating coil assemblies 102, discharge line 134, and drain line 138 to be replaced with air. In doing this, the various portions of inlet air heating system 100, including the plurality of heating coil assemblies 102 may not be damaged due to frozen and/or burst pipes when power plant 10 including inlet air heating system 100 is operating/not operating in a cold-weather environment.

When GT system 24 is in a start-up state (e.g., progressing from non-operational state to operational state), water may be reapplied or recirculated through inlet air heating system 100 to heat fluid 30 as similarly discussed herein with respect to when GT system 24 is in the operation state. That is, stop valve 126 may be opened to allow hot water to be supplied from conduit 72 to mixing valve 124 via hot water line 122. Mixing valve 124 may be opened to allow hot water (and cold water, when applicable) to flow to supply line 112. Drain line 120 in fluid communication with supply line 112 may be closed, to allow supply line 112 to be provided with the water (e.g., hot water, mixture of hot water and cold water) from mixing valve 124. Additionally when GT system 24 is in the start-up state, control valve 140 may be adjusted such that discharge line 134 may only provide water to return line 142, as discussed herein.

Distinct from when GT system 24 is in the operational state, vent valves 110 may be in an open position when GT system 24 is in the start-up state. That is, vent valves 110 may remain open during the start-up state of GT system 24 to allow the air included within the plurality of heating coil assemblies 102 to be purged and/or replaced with the water provided by supply line 112. As water flows into inlet air heating system 100, and more specifically, supply line 112 and inlet portion 104 of heating coil assemblies 102, the air may be pushed out of vent valves 110. In the non-limiting example shown in FIG. 1, inlet air heating system 100 may also include sensors 144 positioned on and/or in communication with inlet portions 104 of heating coil assemblies 102. Sensors 144 in communication with control system 82 of computing device(s) 80 may detect or determine all air has been removed from heating coil assemblies 102 and/or when water has reached and/or is flowing through heating coil assemblies 102 during the start-up state of GT system 24. Once sensors 144 detect or determine that heating coil assemblies 102 are free from air and/or include water, control system 82 in communication with vent valves 110 may adjust, and more specifically close vent valves 110. By closing vent valves 110, water now flowing through heating coil assemblies 102 may not be purged via vent valves 110, and may be utilized to heat fluid 30 flowing through inlet housing 26, as discussed herein.

Figure 2:
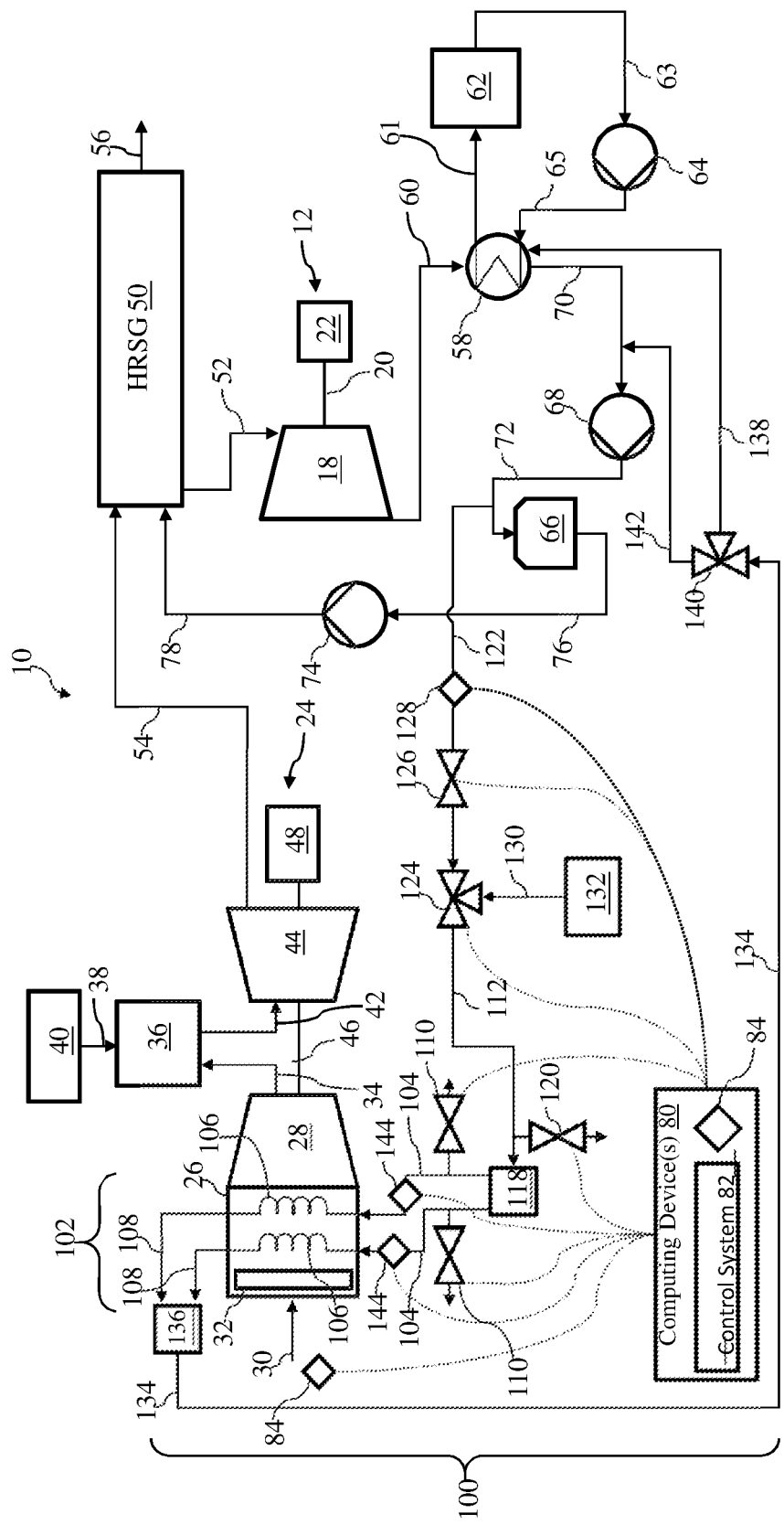
FIG. 2 shows a schematic view of a combined cycle power plant including a gas turbine system, a steam turbine, and an inlet air heating system, according to additional embodiments of the disclosure.
Figure 3:
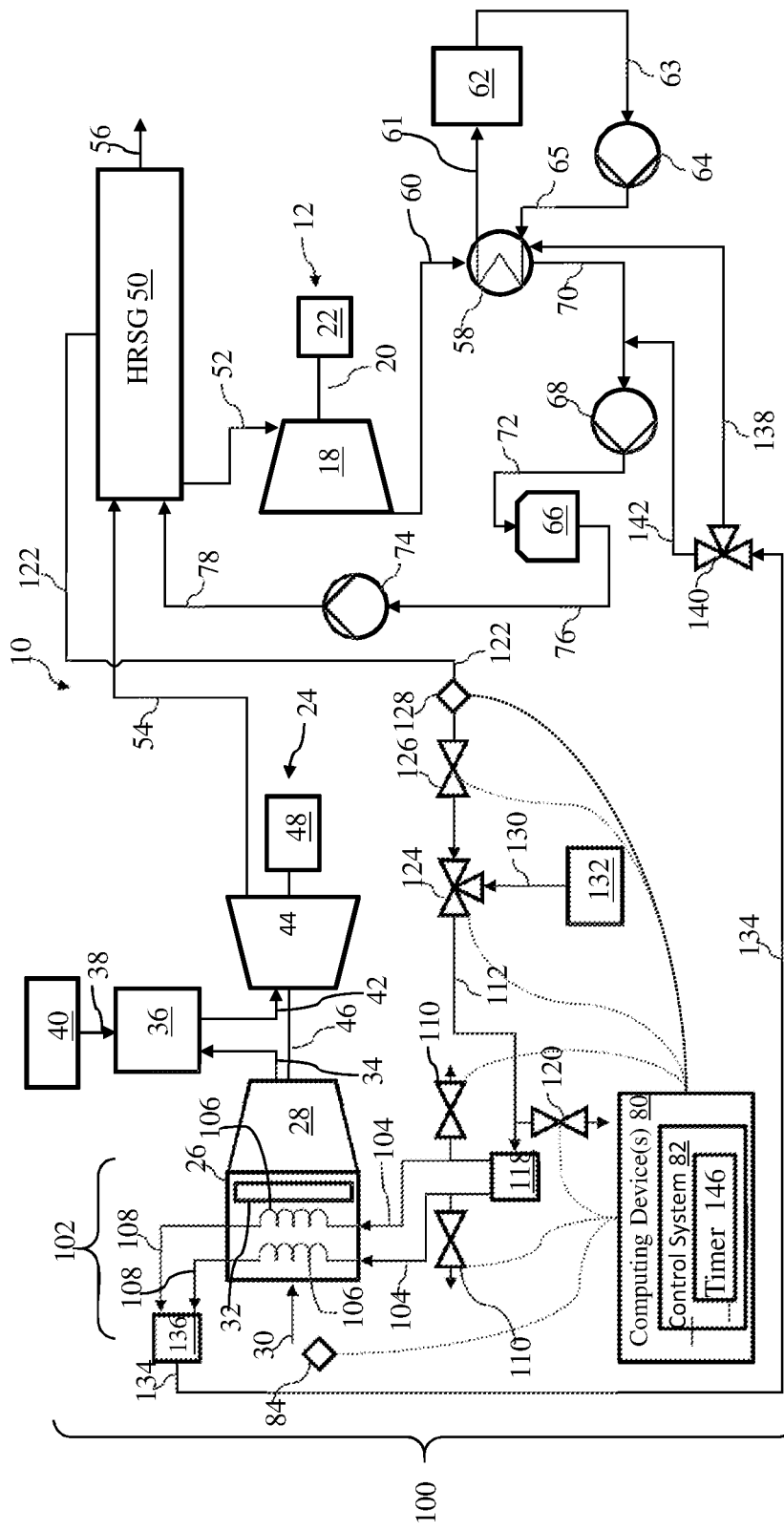
FIG. 3 shows a schematic view of a combined cycle power plant including a gas turbine system, a steam turbine, and an inlet air heating system, according to another embodiment of the disclosure.

FIGS. 2 and 3 show additional non-limiting examples of combined cycle power plant 10 including ST system 12, GT system 24, and inlet air heating system 100. It is understood that similarly numbered and/or named components may function in a substantially similar fashion. Redundant explanation of these components has been omitted for clarity.

With comparison to FIG. 1, the non-limiting example of inlet air heating system 100 shown in FIG. 2 may include portions or components that are positioned in distinct portions of power plant 10 and/or in communication with distinct portions of power plant 10. For example, return line 142 may be in fluid communication with and/or fluidly coupled to control valve 140 and conduit 70. As discussed herein, conduit 70 may be positioned between and/or may fluidly couple condenser 58 and condensate pump 68 of power plant 10. In this non-limiting example, return line 142 may provide the water from the plurality of heating coil assemblies 102 and discharge line 134 back into power plant 10 via conduit 70 to be recirculated and/or reused with within power plant 10, as discussed herein. Return line 142 may provide the water directly to conduit 70 when GT system 24 is in the operational state.

Turning to FIG. 3, and similar to FIG. 2, inlet air heating system 100 may include return line 142 in fluid communication with and/or fluidly coupled to control valve 140 and conduit 70. Distinct from the non-limiting examples shown in FIGS. 1 and 2, hot water line 122 of inlet air heating system 100 shown in FIG. 3, may be in communication with distinct portions of power plant 10. In the non-limiting example, hot water line 122 of inlet air heating system 100 may be in fluid communication with and/or fluidly coupled with HRSG 50 of power plant 10. In this non-limiting example, the hot water provided to hot water line 122 may come directly from HRSG 50 and the hot water flowing therein. As discussed herein, hot water line 122 may provide hot water to supply line 112, via mixing valve 124 when GT system 24 is in the start-up state and operational state.

Additionally in the non-limiting example shown in FIG. 3, a portion of heating coil assemblies 102 may be positioned downstream of filter 32 included in inlet housing 26. More specifically, coil portion 106 for each of the plurality of heating coil assemblies 102 may be positioned within inlet housing 26, downstream of filter 32. As such, fluid 30 flowing through inlet housing 26 may pass through filter 32 before passing over, contacting, and/or being heated by coil portion 106 of heating coil assemblies 102, and proceeding through compressor 28 of GT system 24.

Also as shown in the non-limiting of FIG. 3, inlet air heating system 100 may not include sensors 144. Rather, control system 82 of computing device(s) 80 may include a timer 146. Timer 146 of control system 82 may include information and/or data pertaining to GT system 24 and inlet air heating system 100. For example, timer 146 may include data relating to a predetermined time for GT system 24 to go from the start-up state to the operational state. Additionally, or alternatively, timer 146 may include data relating to a predetermined time for the water to reach the plurality of heating coil assemblies 102, and/or a predetermined time for heating coil assemblies 102 (and/or inlet air heating system 100) to be purged of all air via vent valves 110. During the start-up of GT system 24, vent valves 110 may remain open as discussed herein. Additionally when GT system 24 starts up or is in the start-up state, timer 146 may begin counting down from the predetermined times. Once the predetermined time has lapsed, control system 82 may adjust, and more specifically close, vent valves 110 during the start-up state of GT system 24. As discuss herein, closing vent valves 110 after the predetermined time has lapsed may ensure that water now flowing through heating coil assemblies 102 may not be purged via vent valves 110, and may be utilized to heat fluid 30 flowing through inlet housing 26.

Technical effect is to provide an inlet air heating system that is in direct communication with the combined cycle power plant, and utilizes fluid (e.g., water) of the combined cycle power plant, and is not a standalone system from the combined cycle power plant, and/or requires the sole supply of fluids from a source or system other than those included in the combined cycle power plant. Additionally, the technical effect is to provide an inlet air heating system that allows the heating coils positioned within an air inlet housing of the gas turbine system for the combined cycle power plant to be drained (e.g., void of water) during shutdown or inoperable states to prevent the freezing and/or bursting of the heating coils.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. An inlet air heating system for a gas turbine system of a combined cycle power plant, the inlet air heating system comprising: a plurality of heating coil assemblies at least partially positioned within an inlet housing of the gas turbine system; a vent valve in fluid communication with each of the plurality of heating coil assemblies, the vent valve allowing air to flow into and out of the plurality of heating coil assemblies when in an open position; a supply line in fluid communication with the plurality of heating coil assemblies, the supply line providing water to the plurality of heating coil assemblies; a hot water line in fluid communication with the supply line and a component of the combined cycle power plant positioned downstream of a condenser of the combined cycle power plant, the hot water line providing hot water from the combined cycle power plant to the supply line; and a drain line in fluid communication with the plurality of heating coil assemblies and the condenser of the combined cycle power plant, the drain line providing the water from the plurality of heating coil assemblies to the condenser, further comprising: a discharge line in fluid communication with the plurality of heating coil assemblies, the discharge line receiving the water directly from the plurality of heating coil assemblies; a control valve fluidly coupling the discharge line and the drain line to provide the water from the discharge line to the drain line; and a return line fluidly coupled to the control valve, the return line receiving the water from the discharge line via the control valve, and providing the water to a first conduit of the combined cycle power plant positioned downstream of the condenser.

2. The inlet air heating system of claim 1, further comprising:
a cold water line providing cold water; and
a mixing valve fluidly coupling the supply line, the hot water line, and the cold water line, the mixing valve providing at least one of the hot water from the hot water line and the cold water from the cold water line to the supply line.

3. The inlet air heating system of claim 2, further comprising:
a stop valve positioned on and in fluid communication with the hot water line, the stop valve positioned upstream of the mixing valve.

4. The inlet air heating system of claim 1, wherein the hot water line provides the water to the supply line via one of: a second conduit positioned downstream of the condenser of the combined cycle power plant, or a heat recovery steam generator (HRSG) of the combined cycle power plant.

5. The inlet air heating system of claim 1, wherein each of the plurality of heating coil assemblies includes:
an inlet portion in direct fluid communication with the supply line;
a coil portion positioned downstream of the inlet portion; and
an outlet portion positioned downstream of the coil portion.

6. The inlet air heating system of claim 5, wherein the vent valve is in direct fluid communication with the inlet portion of each of the plurality of heating coil assemblies.

7. The inlet air heating system of claim 1, wherein the vent valve in fluid communication with each of the heating coil assemblies is in the open position during a non-operational state of the gas turbine system of the combined cycle power plant to allow all the water in the plurality of heating coil assemblies to be replaced with air.

8. The inlet air heating system of claim 7, wherein the vent valve in fluid communication with each of the plurality of heating coil assemblies is:
in the open position during a start-up state of the gas turbine system of the combined cycle power plant to allow all the air in the plurality of heating coil assemblies to be replaced with the water; and
in a closed position during an operational state of the gas turbine system of the combined cycle power plant to prevent the water from being removed from the plurality of heating coil assemblies via the vent valve.

9. The inlet air heating system of claim 7, further comprising:
a drain valve in fluid communication with the supply line, wherein the drain valve is:
in a closed position during a start-up state and an operational state of the gas turbine system of the combined cycle power plant to prevent the water from leaving the supply line; and
in an open position during the non-operational state of the gas turbine system of the combined cycle power plant to allow all of the water to be purged from the supply line.

10. A combined cycle power plant, comprising:
a gas turbine system including an inlet housing for receiving ambient air;
a heat recovery steam generator (HRSG) in fluid communication with the gas turbine system, the HRSG receiving exhaust gas from the gas turbine system;
a steam turbine in fluid communication with the HRSG, the steam turbine receiving steam generated by the HRSG using the exhaust gas from the gas turbine system;
a condenser in fluid communication with the steam turbine, the condenser receiving exhaust steam from the steam turbine; and
an inlet air heating system in communication with the inlet housing of the gas turbine system and in communication with the condenser, the inlet air heating system including:
a plurality of heating coil assemblies at least partially positioned within the inlet housing of the gas turbine system;
a vent valve in fluid communication with each of the plurality of heating coil assemblies, the vent valve allowing air to flow into and out of the plurality of heating coil assemblies when in an open position;
a supply line in fluid communication with the plurality of heating coil assemblies, the supply line providing water to the plurality of heating coil assemblies;
a hot water line in fluid communication with the supply line and one of the HRSG or a conduit positioned downstream of a condenser, the hot water line providing hot water to the supply line; and
a drain line in fluid communication with the plurality of heating coil assemblies and the condenser, the drain line providing the water from the plurality of heating coil assemblies to the condenser, further comprising:
a condensate pump in fluid communication with the condenser, the condensate pump removing the water included in the condenser;

a deaerator in fluid communication with the condensate pump, the deaerator receiving the water from the condensate pump and removing at least one gas from the water; and a forwarding pump in fluid communication with the deaerator and the HRSG, the forwarding pump providing the water from the deaerator to the HRSG, wherein the inlet air heating system further comprises:
  a discharge line in fluid communication with the plurality of heating coil assemblies, the discharge line receiving the water directly from the plurality of heating coil assemblies;
  a control valve fluidly coupling the discharge line and the drain line to provide the water from the discharge line to the drain line; and
  a return line fluidly coupled to the control valve, the return line receiving the water from the discharge line via the control valve, and providing the water to one of:
    a first conduit fluidly coupling the condenser and the condensate pump, or
    a second conduit fluidly coupling the deaerator and the forwarding pump.

11. The combined cycle power plant of claim 10, wherein the inlet air heating system further comprises:
  a cold water line providing cold water; and
  a mixing valve fluidly coupling the supply line, the hot water line, and the cold water line, the mixing valve providing at least one of the hot water from the hot water line and the cold water from the cold water line to the supply line.

12. The combined cycle power plant of claim 10, wherein each of the plurality of heating coil assemblies of the inlet air heating system includes:
  an inlet portion in direct fluid communication with the supply line;
  a coil portion positioned downstream of the inlet portion; and
  an outlet portion positioned downstream of the coil portion.

13. The combined cycle power plant of claim 12, wherein the vent valve of the inlet air heating system is in direct fluid communication with the inlet portion of each of the plurality of heating coil assemblies.

14. The combined cycle power plant of claim 10, wherein the vent valve of the inlet air heating system is in the open position during a non-operational state of the gas turbine system to allow all the water in the plurality of heating coil assemblies to be replaced with air.

15. The combined cycle power plant of claim 14, wherein the vent valve of the inlet air heating system is:
  in the open position during a start-up state of the gas turbine system to allow all the air in the plurality of heating coil assemblies to be replaced with the water; and
  in a closed position during an operational state of the gas turbine system to prevent the water from being removed from the plurality of heating coil assemblies via the vent valve.

16. The combined cycle power plant of claim 15, wherein the inlet air heating system further comprises:
  a sensor in communication with the plurality of heating coil assemblies, the sensor determining when all the air in the plurality of heating coil assemblies is replaced with the water during the start-up state of the gas turbine system.

17. The combined cycle power plant of claim 15, wherein the inlet air heating system further comprises:
  a drain valve in fluid communication with the supply line, wherein the drain valve is:
    in a closed position during the start-up state and the operational state of the gas turbine system to prevent the water from leaving the supply line; and
    in an open position during the non-operational state of the gas turbine system to allow all of the water to be purged from the supply line.

* * * * *